(12) United States Patent
Ren et al.

(10) Patent No.: US 7,860,853 B2
(45) Date of Patent: Dec. 28, 2010

(54) DOCUMENT MATCHING ENGINE USING ASYMMETRIC SIGNATURE GENERATION

(75) Inventors: Liwei Ren, Sunnyvale, CA (US); Shu Huang, San Jose, CA (US); Fei Huang, Sunnyvale, CA (US); Yingqiang Lin, Sunnyvale, CA (US)

(73) Assignee: Provilla, Inc., Mountain View, CA (US)

( * ) Notice: Subject to any disclaimer, the term of this patent is extended or adjusted under 35 U.S.C. 154(b) by 382 days.

(21) Appl. No.: 12/069,659

(22) Filed: Feb. 11, 2008

(65) Prior Publication Data

US 2008/0195606 A1 Aug. 14, 2008

Related U.S. Application Data

(60) Provisional application No. 60/889,775, filed on Feb. 14, 2007.

(51) Int. Cl.
*G06F 7/00* (2006.01)
(52) U.S. Cl. ............... 707/706; 707/715; 707/723; 707/748; 705/2; 705/26; 705/36
(58) Field of Classification Search ................. 707/706, 707/715, 748, 723; 705/2, 26, 36
See application file for complete search history.

(56) References Cited

U.S. PATENT DOCUMENTS

| | | | | |
|---|---|---|---|---|
| 4,028,674 | A * | 6/1977 | Chuang | 382/123 |
| 5,920,854 | A * | 7/1999 | Kirsch et al. | 705/2 |
| 6,493,709 | B1 | 12/2002 | Aiken | |
| 6,584,470 | B2 | 6/2003 | Veale | |
| 7,031,972 | B2 | 4/2006 | Ren et al. | |
| 7,599,938 | B1 * | 10/2009 | Harrison, Jr. | 707/999.01 |
| 7,774,335 | B1 * | 8/2010 | Scofield et al. | 707/748 |
| 2002/0002550 | A1 * | 1/2002 | Berman | 707/3 |
| 2003/0172066 | A1 * | 9/2003 | Cooper et al. | 707/7 |
| 2004/0162786 | A1 | 8/2004 | Cross et al. | |
| 2005/0022102 | A1 * | 1/2005 | Gentry | 715/500 |
| 2005/0038787 | A1 * | 2/2005 | Cheung et al. | 707/9 |
| 2005/0102235 | A1 * | 5/2005 | Waidner | 705/51 |
| 2006/0253439 | A1 | 11/2006 | Ren et al. | |
| 2006/0294583 | A1 * | 12/2006 | Cowburn et al. | 726/10 |
| 2007/0005948 | A1 * | 1/2007 | Kuhls et al. | 713/1 |

(Continued)

OTHER PUBLICATIONS

May et al.—"Strategies for query unnesting in XML databases"—ACM transactions on Database Systems (TODS), vol. 31, Issue 3, Sep. 2006, (pp. 968-1013).*

(Continued)

*Primary Examiner*—John E Breene
*Assistant Examiner*—Anh Ly
(74) *Attorney, Agent, or Firm*—Okamoto & Benedicto LLP

(57) ABSTRACT

An automated method of matching an input document to a set of documents from a document repository. A signature database is stored, the signature database including a document identifier and signatures generated by a first signature generator for each of the set of documents. The input document is received and signatures are generated for the input document using a second signature generator, and the signature database is searched using the signatures generated for the input document. The first and second signature generators are configured such that different numbers of signatures are generated for a same document. Other embodiments, aspects and features are also disclosed.

20 Claims, 9 Drawing Sheets

U.S. PATENT DOCUMENTS

| | | | |
|---|---|---|---|
| 2007/0086628 A1* | 4/2007 | Fuchs et al. | 382/119 |
| 2007/0136416 A1* | 6/2007 | Taylor | 709/203 |
| 2007/0226504 A1* | 9/2007 | de la Iglesia et al. | 713/176 |
| 2007/0266234 A1* | 11/2007 | Inami | 713/153 |
| 2010/0121845 A1* | 5/2010 | Aravamudan et al. | 707/723 |

OTHER PUBLICATIONS

Simon P. Chung and Aloyssius K. Mok—"Advanced Allergy attacks: does a corpus really help" Proceddings of the 10$^{th}$ international conference on recent advances in intrusion detection. Lecture Notes in Computer Science, RAID 2007 (pp. 236-255).*

Anagnostopoulos, A. et al., "Sampling Search-Engine Results," Proceedings of the 14th International Conference on World Wide Web, WWW 2005, May 10-14, 2005, pp. 245-256, Chiba, Japan.

Chen. J., et al., "Knowledge Discovery and Data Mining Based on Power Plant Real-Time Database: A Survey," Proceedings of International Conference on Power Engineering, Oct. 8-12, 2001, pp. 1-5, Xi'an, China.

Chen, L, et al., "Template Detection for Large Scale Search Engines," SAC '06, Apr. 23-27, 2006, 5 pages, Dijon, France.

Hamilton. N., "The Mechanics of a Deep Net Metasearch Engine," Proceedings of the 12th International World Wide Web Conference, 2003, 2 pages.

Jessop, M., et al., Pattern Matching Against Distributed Datasets, 2004, 6 pages.

Lai, W.C., et al., "An Anatomy of a Large-Scale Image Search Engine," IEEE MSE, Dec. 2002, 4 pages, Irvine.

Lavrenko, V., et al., "Relevance Models for Topic Detection and Tracking," 2002, 6 pages.

Pallickara, S. et al., "Incorporating an XML Matching Engine in Distributed Brokering Systems," Proceedings of the International Conference on Parallel and Distributed Processing Techniques and Applications, (PDPTA '03) 2003, pp. 1-7.

Chakrabarti, et al., "Scalable feature selection, classification and signature generation for organizing large text databases into hierarchical taxonomies", 1998, pp. 163-178, vol. 7, No. 3, the VLDB Journal.

PCT International Search Report for Application No. PCT/US08/01868, 2 sheets, Dated Feb. 14, 2007.

* cited by examiner

DOCUMENT MATCHING ENGINE USING ASYMMETRIC SIGNATURE GENERATION

CROSS REFERENCE TO RELATED APPLICATIONS

This application claims the benefit of U.S. Provisional Patent Application No. 60/889,775, entitled "Asymmetric Document Signature Generation", filed Feb. 14, 2007 by Liwei Ren et al., the contents of which is herein incorporated by reference in its entirety.

This application is related to U.S. patent application Ser. No. 11/361,340, now U.S. Pat. No. 7,516,130, issued Apr. 7, 2009, entitled "Matching Engine with Signature Generation," filed Feb. 24, 2006 by Liwei Ren et al., the contents of which is herein incorporated by reference in its entirety.

BACKGROUND

1. Field of Art

The present invention generally relates to the field of search engine technologies, and more specifically, to content match engines.

2. Description of the Related Art

Conventional Search Engines

In general, an enterprise search engine is a software system to search relevant documents with given query statements. The enterprise search engine typically consists of a crawler, an indexer, a searcher and a query engine. The crawler gathers documents from pre-assigned locations and dumps them into document repositories. The indexer fetches documents from the document repositories, creates indices from the documents, and stores the indices into an index database. The searcher searches the index database and returns a list of relevant documents (referenced as "hits") in response to a specific query. The query engine parses a query expression provided by a user and sends query commands to searcher for processing.

Consider, for example, the conventional search system 100 that is depicted in FIG. 1. The conventional search system 100 may fetch documents from one or more document sources 105(*a-n*) that are stored in a document repository 110. The documents from document sources 105(*a-n*) are indexed by a search engine 120, and the indexed documents 122 are stored in an index database 124.

Subsequently, a user 150 seeking information may use a query composer 130 to compose a query to search documents 126 in the search engine 120. The search may then be conducted by the search engine 120 against the indexed documents 122 in the index database 124. When a match or matches (i.e. "hits") are found corresponding to the query, the search engine 120 returns the matching indexed documents as search results 135 that are presented to the user 150.

The above-discussed search system, while an improvement over manual searching, still has various limitations. One limitation is that the indexed documents may not necessarily be relevant with respect to the context of the query. For instance, a search for documents related to National Football League scores may return results related to the English Football (Soccer) rather than the American Football league.

More generally, conventional search systems are insufficient to search relevant documents for many query problems. For example, consider a problem in which the relevance of two documents is assumed to be measured at some predetermined percentage value, for example, X %. Given an input document and the percentage value X %, a search of relevant documents from the document repositories is conducted so that the relevance between this input document and any of the returning documents must be greater than X %.

The direct application of a conventional search system to the above query problem results in several disadvantages. For example, a conventional search system may lack an accurate and efficient measurement of the document relevance.

In addition, a conventional search system generally returns a large list of documents, most of which may not be relevant at all. Thus, the precision rate of retrieval is low. Returning a large list of documents is a common problem of conventional search engine technologies because the query presented by key terms is unable to precisely depict the documents that users are trying to retrieve.

Another disadvantage with the direct application of conventional search systems is that they typically measure the relevance of documents through models that are often inaccurate or that are highly computing intensive. Examples, of these inaccurate and resource intensive models include a term vector-space model, a probabilistic model, a latent semantic space model, and the like.

Therefore, there is a need to modify and improve conventional search systems so that, in response to a query, the search system returns a precise and accurate list of documents having a high degree of relevance. In addition, there is a need to modify and improve conventional search systems to make efficient and effective use of available resources.

SUMMARY

One embodiment relates to an automated method of matching an input document to a set of documents from a document repository. A signature database is stored, the signature database including a document identifier and signatures generated by a first signature generator for each of the set of documents. The input document is received and signatures are generated for the input document using a second signature generator, and the signature database is searched using the signatures generated for the input document. The first and second signature generators are configured such that different numbers of signatures are generated for a same document.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

As discussed above in the Background section, there is a need to modify and improve the conventional search engine architecture to precisely and accurately return documents having a high degree of relevance in response to a query.

Matching Engine with Signature Generation

One approach to efficiently find highly-relevant documents is through application and use of signatures associated with a document. This approach is disclosed in co-pending U.S. Application No., 11/361,340, "Matching Engine with Signature Generation," filed Feb. 24, 2006 by Liwei Ren et al.

Figure 1:
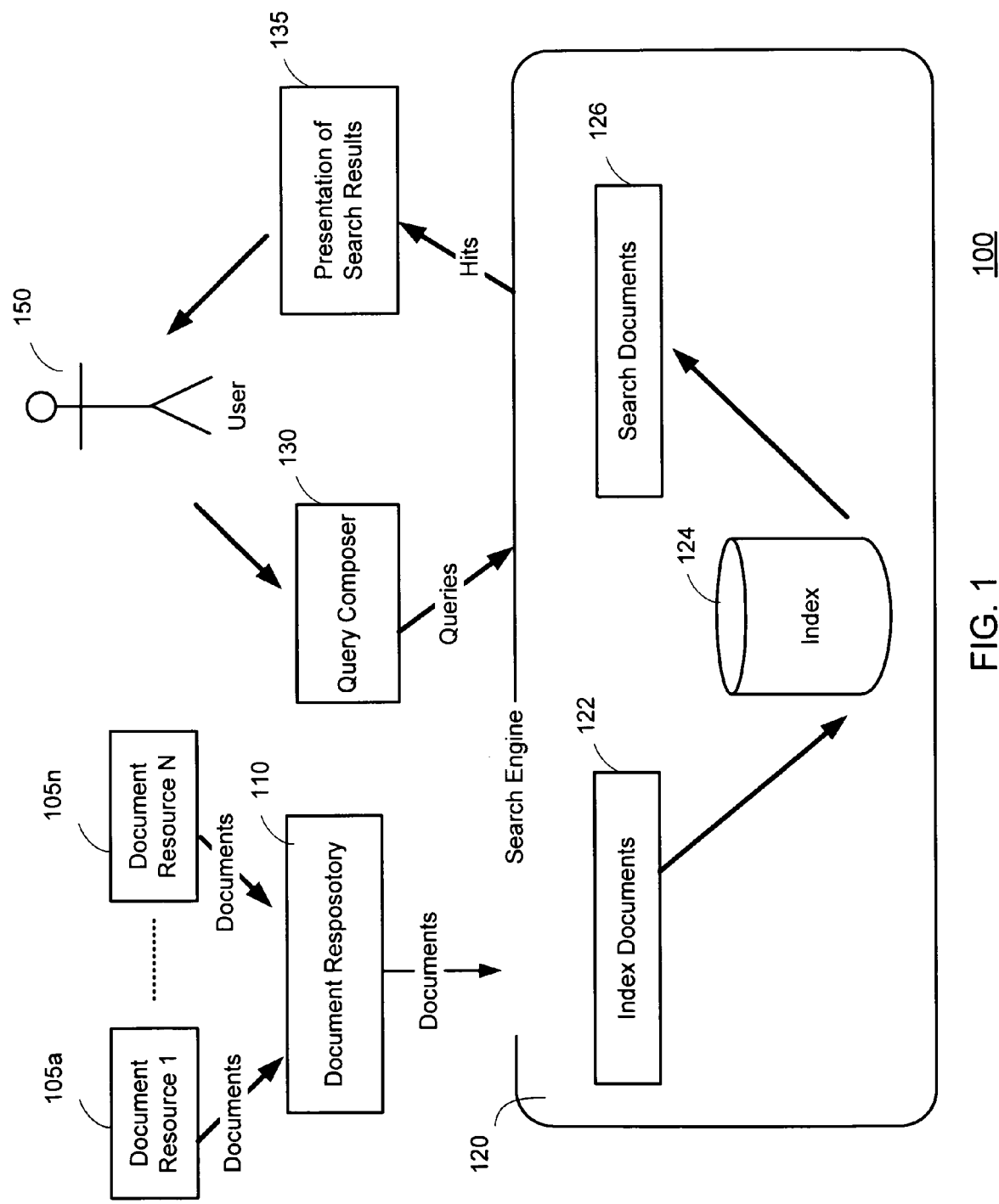
FIG. 1 illustrates an example of a conventional architecture of a search engine.
Figure 2A:
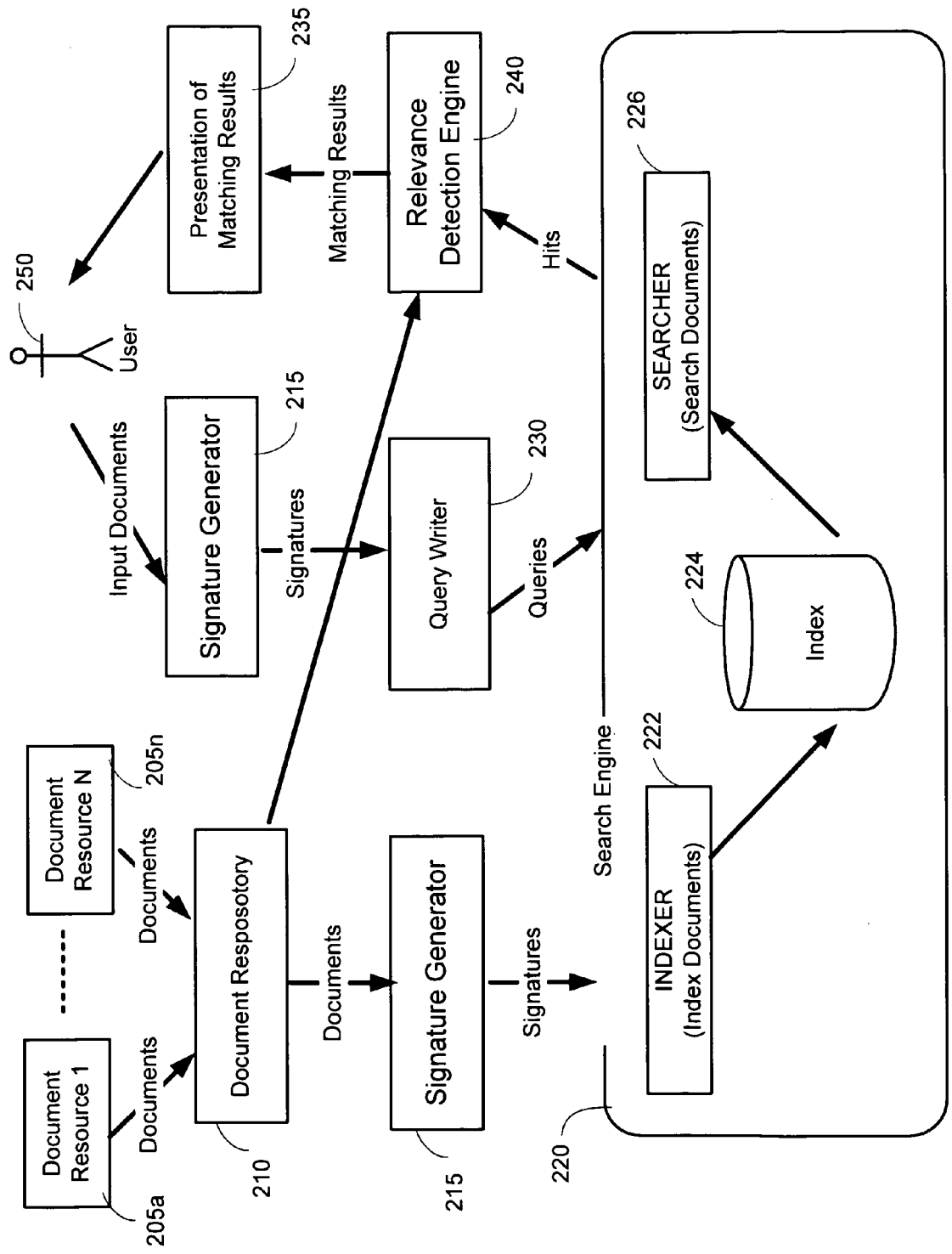
FIG. 2A depicts an embodiment of an architecture of a matching engine with signature generation.

FIG. 2A illustrates an architecture of a matching engine with signature generation, as disclosed in U.S. Application No., 11/361,340. As shown in FIG. 2A, one or more document resources 205 (a-n) may be collected (or stored) in a document repository 210. Generally, the architecture is structured to pre-process the tokens from the document, select the most informative tokens, and, based on the informative tokens, generate signatures associated with the document. The architecture also is configured to ensure uniqueness of the generated signatures with respect to an input document context. The architecture is further configured to limit the number of signature collected while keeping the stability of the collection across varied versions of the same document. It is noted that in one embodiment, the signature is a value, for example, a hash representation of corresponding to particular information or string of ASCII characters in accordance with the selected tokens.

Referring now to an embodiment of a process with respect to the architecture, initially it is noted that documents 205 may be collected manually or through use of a crawler. For example, a crawler may be configured to visit all assigned document sources to collect documents, assigns a unique document identifier (ID) to each document that is collected, and then place the unique document ID and document into the document repository 210.

A signature generator 215 generates a list of signatures from particular documents in the document repository 210. Signatures are strings or values that one makes from the unique information that represents a document. This representative information is unique to the document and stable when the document has moderate changes. The signature generator 215 may be configured to store one or more signature generation processes. The signature generator 215 may be further configured to select and execute one of the stored processes based on a type of document to be processed. For example, one embodiment of a signature generation process is adapted (configured) for use with English language documents, for example, in ASCII code, and is further described with respect to FIG. 3. The process can also apply to other languages that may use lower cases, stop-words and stemming, for example, Romance and Latin languages. Another embodiment of a signature generation process is adapted for use with documents in UTF-8 (universal transformation format) encoding for any language supported by Unicode, and is further described with respect to FIG. 4.

Once the signature generator 215 generates signatures for the particular document, an indexer 222 indexes the document with unique document identifier (ID) and the signatures generated by the signature generator 215. The result is an indexed document (by indexer 222) that is stored in an index database 224 of a search engine 220.

With the indexed document in the index database 224 of the search engine 220, the document is ready to be queried against. A user 250 may use a query writer 230 to compose a query expression based on the signatures generated by the signature generator 215. It is noted that the input document provided by a user 250 provides a query input. The user 250 does not need to know what the signatures are; rather, the user 250 only needs to know what the input document is. The user 250 passes the input document to signature generator 215. The signatures output from the signature generator 215 are passed to the query writer 230 for query composition. The composed query is then passed to a searcher 226 (search mechanism) for searching documents.

The searcher 226 in the search engine 220 searches the index database 224 using the query provided through the query writer 230. The searcher returns a list of possible relevant documents 226 ("hits") to a relevance detection engine 240. The relevance detection engine 240 calculates a relevance (e.g., in percentage terms) between the input document and the hits. The relevance detection engine 240 is configured to include one or more processes for a relevance calculation (or analysis). A first embodiment of a relevance detection process is further described with respect to FIG. 5. A second embodiment of relevance detection process is further described with respect to FIG. 6. It is noted that the relevance detection engine 240 can select and/or implement either of these processes. For example, for small documents, the first embodiment of the relevance detection process may be deployed and for larger documents, e.g., greater than 10 megabytes (MB) in size, the second embodiment of the relevance detection process may be deployed.

The matching engine architecture discussed above may be used to efficiently find a limited set of highly-relevant documents. For example, given a query to find documents related to document D with a relevance percentage X %, the matching engine efficiently searches a list of documents $\{D_1, \ldots, D_n\}$ from a document repository and returns a set of documents from the list which have a relevance greater than X % in relation to document D.

Bandwidth Constraints and Scalability

While the matching engine architecture of FIG. 2A may be used to efficiently find a limited set of highly-relevant documents, there are shortcomings with the architecture. In particular, the architecture has limitations in relation to bandwidth constraints and scalability.

Figure 2B:
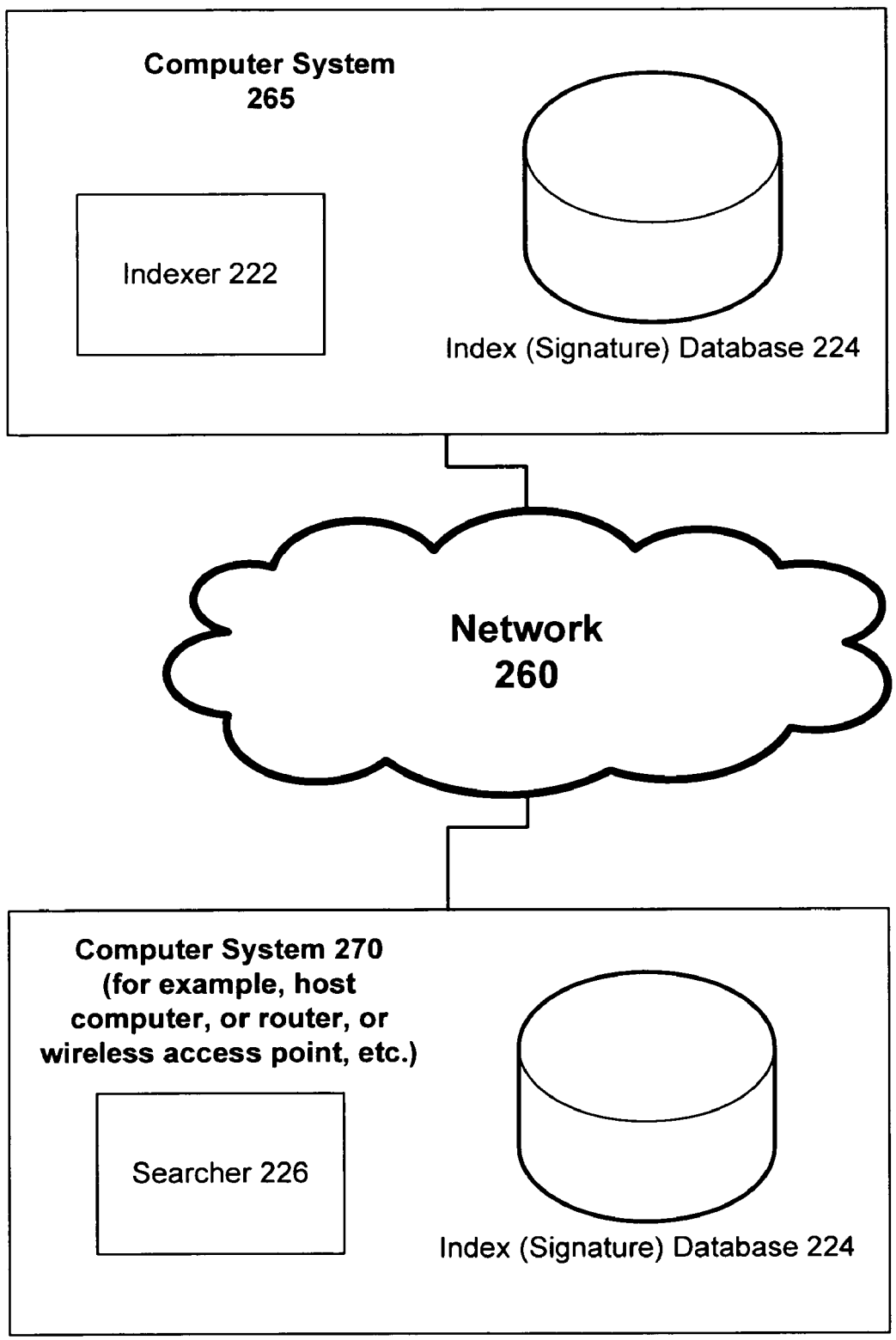
FIG. 2B illustrates deployment of the matching engine with signature generation in a distributed computing environment.

Consider the matching engine architecture in the context of a distributed computing environment. In other words, consider the case where the indexer 222 and the searcher 226 are deployed at different computer systems across a network 260. This case is depicted in FIG. 2B.

In this case, the signature (index) database 224 is generated at the computer system 265 of the indexer 222. However, the searcher 226 also needs access to the signature (index) database 224 in order to execute the document search queries. Therefore, a copy of the signature (index) database 224 needs to be downloaded to the computer system 270 of the searcher 226.

For example, in the context of a large corporate enterprise, the number of documents in the document depository may grow to be a very large number, for example, in excess of a million documents or more. As the number of documents indexed becomes larger and larger, the signature (index) database 224 becomes larger and larger. As such, the network bandwidth cost of downloading a large signature (index) database 224 may become prohibitive and problematic. In addition, the data storage space required at the computer system 270 of the searcher 226 to store a large signature (index) database 224 may also become prohibitive and problematic.

In other words, there are scalability limitations to the matching engine architecture of FIG. 2A. The present application discloses a solution which substantially improves the scalability of the matching engine.

Asymmetric Document Signature Generation

As seen from FIG. 2A, the matching engine architecture of FIG. 2A is symmetric in that the signature generator 215 is configured to be the same for both the indexer 222 and the searcher 226. The solution disclosed herein breaks that symmetry.

Figure 2C:
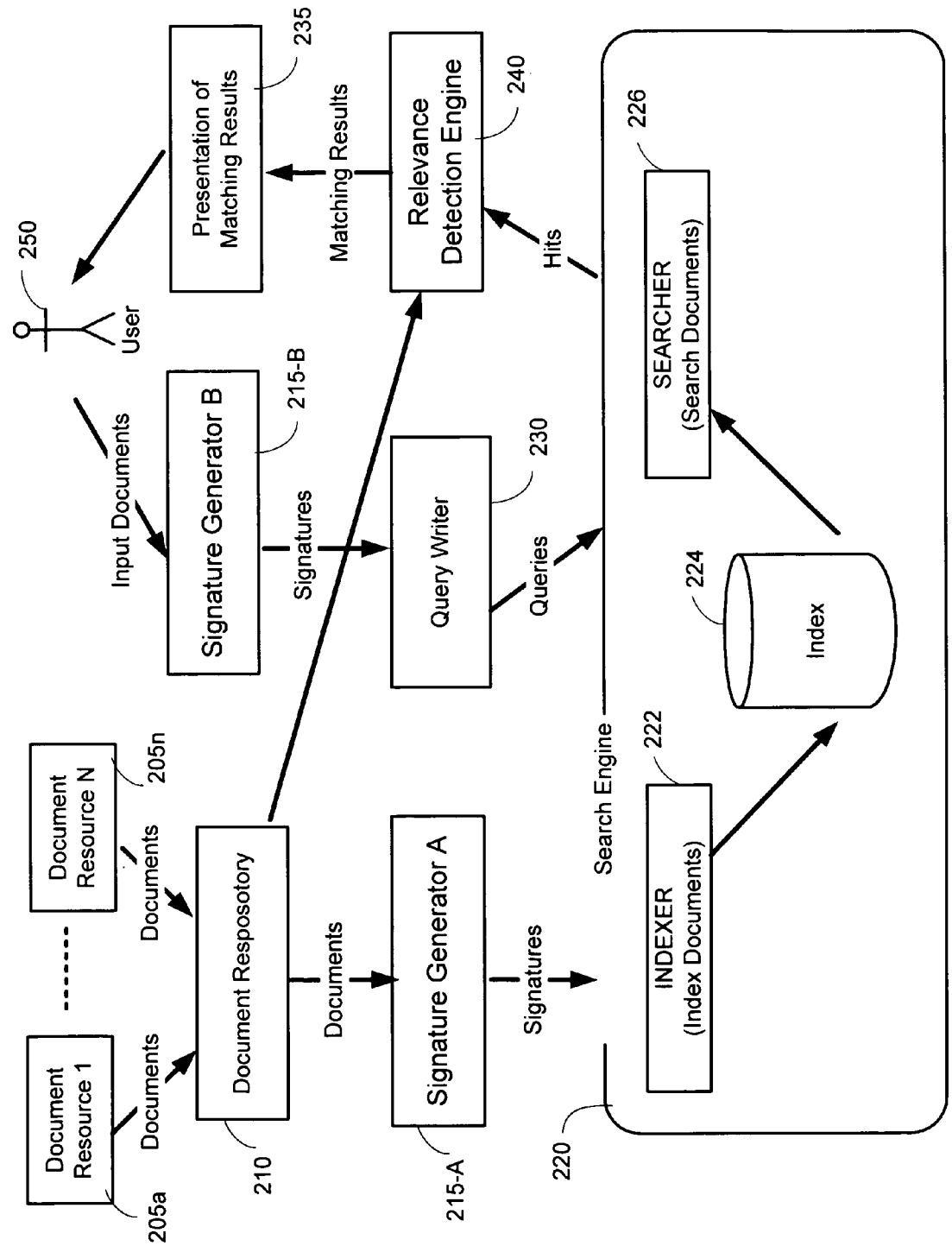
FIG. 2C depicts an embodiment of an architecture of a matching engine with asymmetric signature generation in accordance with the present invention.

FIG. 2C depicts an embodiment of an architecture of a matching engine with asymmetric signature generation in accordance with the present invention. As indicated in the diagram, the two signature generators 215-A (for the indexer) and 215-B (for the searcher) are now configured differently.

More particularly, the two signature generators 215-A (for the indexer) and 215-B (for the searcher) may use a same signature generation algorithm or process, but they may be configured differently from each other in that they may use different input parameters for the signature generation process. For example, each of the signature generation processes described in the present application (in relation to FIGS. 3 and 4) may be parameterized as follows. S=ExtractSignature (T, M, N), where ExtractSignature( ) represents the parameterized signature generation process, T stands for the input text, M and N are two inputs that determine the maximum signatures to be extracted, and S represents the output signature set.

Symmetric signature generators have the same inputs (use the same parameters) to generate the signatures for any given text:

Signature Generator A: S=ExtractSignature(T, M, N)
Signature Generator B: S=ExtractSignature(T, M, N)

where M and N are the same.

For example, a particular implementation may set M=5 and N=50 uniformly for all input text T.

In contrast, asymmetric signature generators have different inputs (use different parameters) to generate the signatures for any given text. For example, in one embodiment, the input parameter N may be different for the two signature generators, while the input parameter M may be the same.

In accordance with one embodiment of the present invention, the input parameter N may be determined using N=Get-N-for-GeneratorA (T, L) for Signature Generator A, and using N=Get-N-for-GeneratorB (T, L) for Signature Generator B, where the functions Get-N-for-GeneratorA( ) and Get-N-for-GeneratorB( ) are different, but both calculate the input number N based on a text size T of the input text and a tolerance level L. The tolerance level defines the expectation that the match engine is able to identify variations of any document. The tolerance level may be presented in percentile. For example, a tolerance level of 30% means that match engine is able to identify a version of a document even if the content has been changed up to 30%.

In one specific implementation, the following six tolerance levels are defined.

Level 1: 5%
Level 2: 10%
Level 3: 20%
Level 4: 40%
Level 5: 50%
Level 6: Best Effort In addition, this specific implementation defines the two functions Get-N-for-GeneratorA and Get-N-for-GeneratorB according to Table 1 shown below, depending on the tolerance level (Levels 1 through 6) and the text size (in various size ranges).

TABLE 1

| Level | Text Size Range in KB | M | N for generator A | N for generator B |
|---|---|---|---|---|
| 1 | 0-10K | 4 | 2 | 32 |
| 1 | 10-20K | 4 | 4 | 64 |
| 1 | 20-30K | 4 | 4 | 64 |
| 1 | 30-50K | 4 | 4 | 128 |
| 1 | 50-70K | 4 | 8 | 128 |
| 1 | 70-80K | 4 | 8 | 128 |
| 1 | 80-100K | 4 | 8 | 128 |
| 1 | 100-500K | 4 | 16 | 1024 |
| 1 | >500K | 4 | 1024 | 1024 |
| 2 | 0-10K | 4 | 2 | 32 |
| 2 | 10-20K | 4 | 4 | 64 |
| 2 | 20-30K | 4 | 8 | 64 |
| 2 | 30-50K | 4 | 8 | 128 |
| 2 | 50-70K | 4 | 16 | 128 |
| 2 | 70-80K | 4 | 16 | 256 |
| 2 | 80-100K | 4 | 16 | 256 |
| 2 | 100-500K | 4 | 64 | 1024 |
| 2 | >500K | 4 | 1024 | 1024 |
| 3 | 0-10K | 4 | 4 | 32 |
| 3 | 10-20K | 4 | 8 | 64 |
| 3 | 20-30K | 4 | 16 | 64 |
| 3 | 30-50K | 4 | 16 | 128 |
| 3 | 50-70K | 4 | 32 | 256 |
| 3 | 70-80K | 4 | 32 | 256 |
| 3 | 80-100K | 4 | 32 | 1024 |
| 3 | 100-500K | 4 | 128 | 1024 |
| 3 | >500K | 4 | 1024 | 1024 |
| 4 | 0-10K | 4 | 8 | 64 |
| 4 | 10-20K | 4 | 16 | 256 |
| 4 | 20-30K | 4 | 16 | 256 |
| 4 | 30-50K | 4 | 32 | 1024 |
| 4 | 50-70K | 4 | 128 | 1024 |
| 4 | 70-80K | 4 | 128 | 1024 |
| 4 | 80-100K | 4 | 128 | 1024 |
| 4 | 100-500K | 4 | 1024 | 1024 |
| 4 | >500K | 4 | 1024 | 1024 |
| 5 | 0-10K | 4 | 16 | 64 |
| 5 | 10-20K | 4 | 32 | 256 |
| 5 | 20-30K | 4 | 32 | 256 |
| 5 | 30-50K | 4 | 32 | 1024 |
| 5 | 50-70K | 4 | 128 | 1024 |
| 5 | 70-80K | 4 | 128 | 1024 |
| 5 | 80-100K | 4 | 128 | 1024 |
| 5 | 100-500K | 4 | 1024 | 1024 |
| 5 | >500K | 4 | 1024 | 1024 |
| 6 | 0-10K | 4 | 16 | 256 |
| 6 | 10-20K | 4 | 32 | 256 |
| 6 | 20-30K | 4 | 32 | 1024 |
| 6 | 30-50K | 4 | 64 | 1024 |
| 6 | 50-70K | 4 | 128 | 1024 |
| 6 | 70-80K | 4 | 128 | 1024 |
| 6 | 80-100K | 4 | 128 | 1024 |
| 6 | 100-500K | 4 | 1024 | 1024 |
| 6 | >500K | 4 | 1024 | 1024 |

As seen in Table 1, N generally increases with increasing tolerance level and, in this implementation, is assumed to be a number which is a power of 2 (i.e. 2, 4, 8, 16, 32, ... ). Given a selected tolerance level, N generally increases with increasing text size. Moreover, given a particular tolerance level and text size, N for generator A is generally smaller than N for generator B.

The above-discussed specific embodiment selects different numbers N in an adaptive manner depending on the text size while applying a same number M. Applicants have determined that this embodiment may be utilized to advantageously reduce a volume of the index (signature) database 224 while maintaining almost the same accuracy and performance of symmetric signature generation.

More generally, applicants have determined the following aspects and features to be advantageous.

Generator A should generate much less number of signatures than generator B.

The numbers of signatures extracted by both Generators A and B should be set accordingly based on the input text size.

Numbers of signatures extracted by both A and B should be set accordingly based on pre-defined tolerance level which is configurable by the system.

Applicants submit the following mathematical theorems in support of the assertion that the asymmetric signature generation may be used so as to reduce the signature database volume while maintaining almost the same accuracy and performance of symmetric signature generation.

For any text T, lets denote S(T, N) as the signature set that is extracted from T by generator given inputs T and N.

Theorem: Let T be any text, and n and m be two numbers with power of 2. If n<m, the following result holds:

$$S(T,n) \subset S(T,m)$$

which means the set S(T, n) is included in S(T, m).

Corollary: Let $T_1$ and $T_2$ be two versions of the same text, and n and m be two numbers with power of 2. If n<m, the following result holds:

$$S(T_1,n) \cap S(T_2,n) \subset S(T_1,n) \cap S(T_2,m) \subset S(T_1,m) \cap S(T_2,m)$$

where $S(T_1, n) \cap S(T_2, m)$ is exactly what the asymmetric signature generation presents the match accuracy. Here n and m can be considered as input numbers for generator A and B respectively.

This corollary states that the match capability of asymmetric signature generation is between the two cases of symmetric signature generation with small signature number and large signature number. As a matter of factor, the experimental data shows it is closer to the second case. However, the signature database is much smaller.

In accordance with one embodiment of the invention, searchers 226 may be configured at various protection points of a network. Placement of the searchers 226 at protection points of a network may be used, for example, to protect against leakage of sensitive data from an institutional network. Protection points of a network may include, for example, internet protocol routers, wireless access points, certain input/output (e.g., data storage or networking) interfaces of host computers (e.g., desktops, laptops), mobile devices and so on.

It is noted that, in one embodiment, the database may be a conventional database, for example, a flat file or relationship database. In addition, various embodiments of the processes disclosed herein may be implemented using one or more software elements. In general, a software element (or modules) may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

Signature Generation Processes

In general, a signature generator extracts a set of signatures from any relevant document. Each signature may be, for example, an ASCII string with fixed length. There are certain criteria that should be satisfied by such signatures. First, two irrelevant documents should not share the same signature. Second, two versions of the same document should share at least one common signature.

The following two signature generation algorithms or processes are designed to extract signatures from ASCII texts and UTF-8 texts, respectively. These two example processes are described in detail below in relation to FIGS. 3 and 4, respectively.

Figure 3:
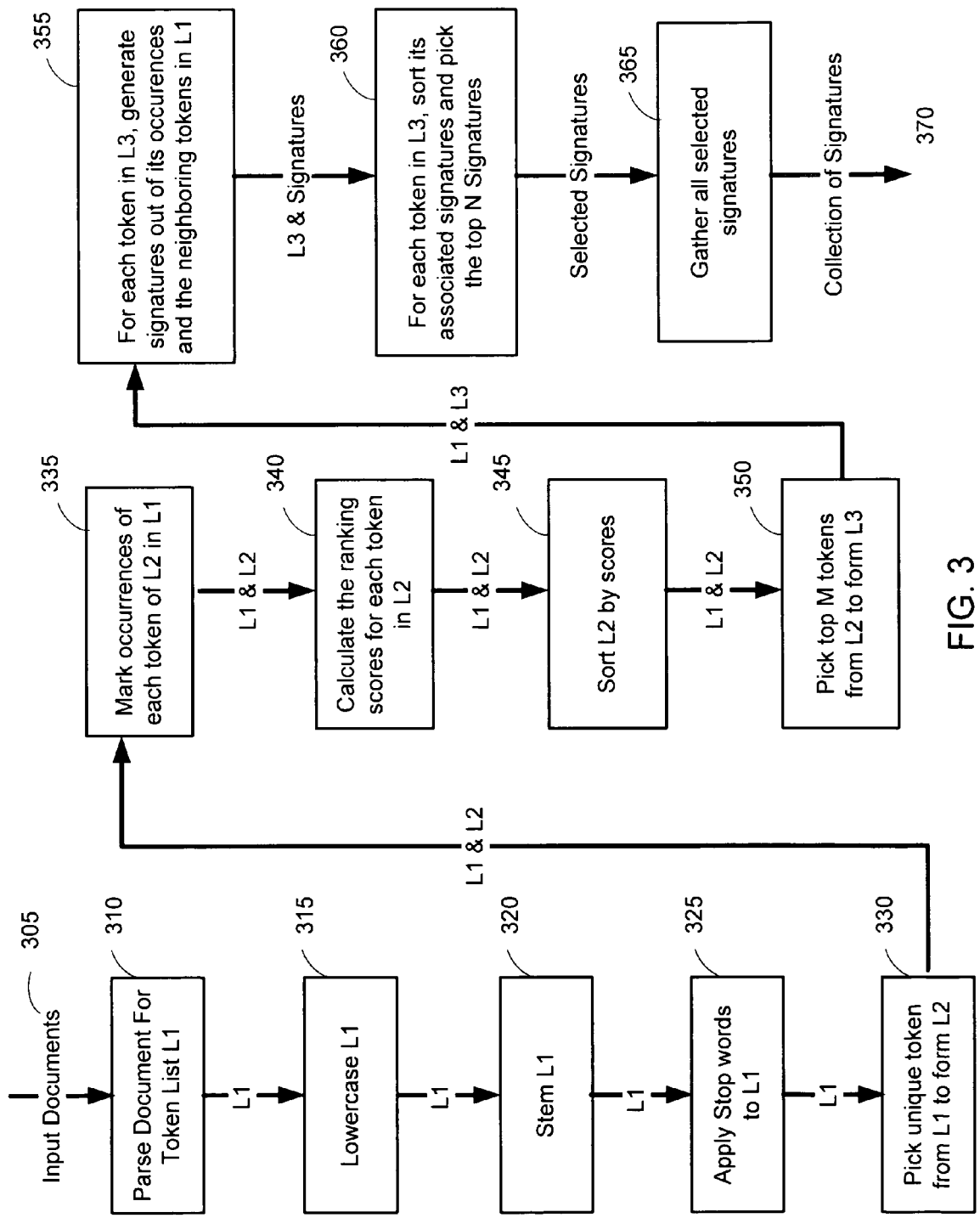
FIG. 3 illustrates a first embodiment of a signature generation process for use with English language documents in accordance with the present invention.

FIG. 3 illustrates a first embodiment of a signature generation process in accordance with the present invention. This embodiment illustrates generating signatures from an English document encoded in ASCII codes. Note the following regarding this process. Steps 310, 315, 320, and 325 pre-process tokens from the documents. Steps 330, 335, 340, 345, and 350 select the most informative tokens. Steps 355 and 360 generate the signatures. In particular, step 355 ensures signatures generated are unique to the input document context, and step 360 limits the number of signatures collected while keeping the stability of the collection across varied versions of the same document.

The process begins with inputting 305 the document. The process parses 310 the document to generate (or create) an initial list of one or more tokens (a token list). In one embodiment, a token includes text in the document separated by a predefined character characteristic. Examples of predefined character characteristics include a delimiter. Once tokens are separated, functions such as stemming, stop-work or lower case analysis can be applied.

The process continues with lower casing 315 each token of the token list. Lower casing 315 is a function that converts each letter of a token to a lower case character. The process also stems 320 each token of the token list. It is noted that word stemming is a process to identify or extract core roots from a word. Continuing, the process applies 325 a stop-word-list to each token of the list to formulate a new first token list (L1). The stop words are words that are considered as carrying no information. Examples of stop words include 'the', 'are', 'do', 'am' and the like. In addition, the process stems each member of a stop-word-list.

The process selects (or picks) 330 each unique token of the first new token list ($L_1$) to form a second token list ($L_2$). For each token in the second token list L2, the process marks 335 its positions of occurrences in the first token list L1 to generate sets:

$$L_1 = \{t_1, t_2, \ldots, t_m\}$$

$$L_2 = \{T_1, T_2 \ldots, T_n\},$$

where denote $T_i = \langle P(i,1), P(i,2), \ldots, P(i,S_i) \rangle$ to mark the positions of occurrences and where i=1, ..., n and where $S_1 + S_2 + \ldots + S_n = m$.

The process then calculates (or generates) 340 a ranking score of each token in the second token list L2. The scores may be determined by:

$$\text{Score}(T_j) = [P(j,S_j) - P(j,1)] * S_j * \text{Weight}(T_j)/\text{Sqrt}(D_j),$$

$$\text{where } D_j = [P(j,2) - P(j,1)]^2 + [P(j,3) - P(j,2)]^2 \ldots + [P(j,S_j) - P(j,S_{j-1})]^2$$

In addition, a score function measures the importance of a token in the text by the frequency and also its assigned weight. It is noted that weight( ) may be a pre-defined function. In one embodiment, its value is a '1', although in alternative embodiments its value may be some pre-assigned number, e.g., 6.8, if the token contains some special characters like '-', '_' and '@'. The score function may be determined by $S_j$*Weight $(T_j)$. The score function may be used to evenly distribute tokens over the document to get better scores. This is determined by $[P(j,S_j)-P(j,1)]/\text{Sqrt}(D_j)$.

Next, the process sorts 345 the second token list $L_2$ by the calculated scores and then selects (or picks) 350 the top M tokens by score from that list ($L_2$). It is noted that M can be any integer and may be predefined within the system or may be selected as an input into the system. The top M tokens by score from the second token list $L_2$ creates a third token list $L_3$. For each token $T_j$ of the third token list $L_3$, generate 355 signatures out of its occurrences and the neighboring tokens in $L_1$. This process also can be represented as:

For each $k \in \{P(j,1), P(j,2), \ldots, P(j,S_i)\}$, pick its neighboring 2d tokens in L1 and concatenate them together to form a string, that's $t_{k-d} + \ldots + t_{k-1} + t_k + t_{k+1} + \ldots + t_{k+d}$.

Encoding this string gives us a signature $F_{j,k}$.

For each $T_j$ in the third token list $L_3$, the process sorts the list $\{F_{j,1}, F_{j,2}, \ldots F_{j,Sj}\}$ and selects 360 the top N signatures from this sorted list. It is noted that N can be any integer and may be predefined within the system or may be selected as an input into the system. Next, for all members of the third token list $L_3$, there is a total of (M*N) selected signatures are gathered (or collected) 365. The process then outputs 370 the collection of signatures.

Figure 4:
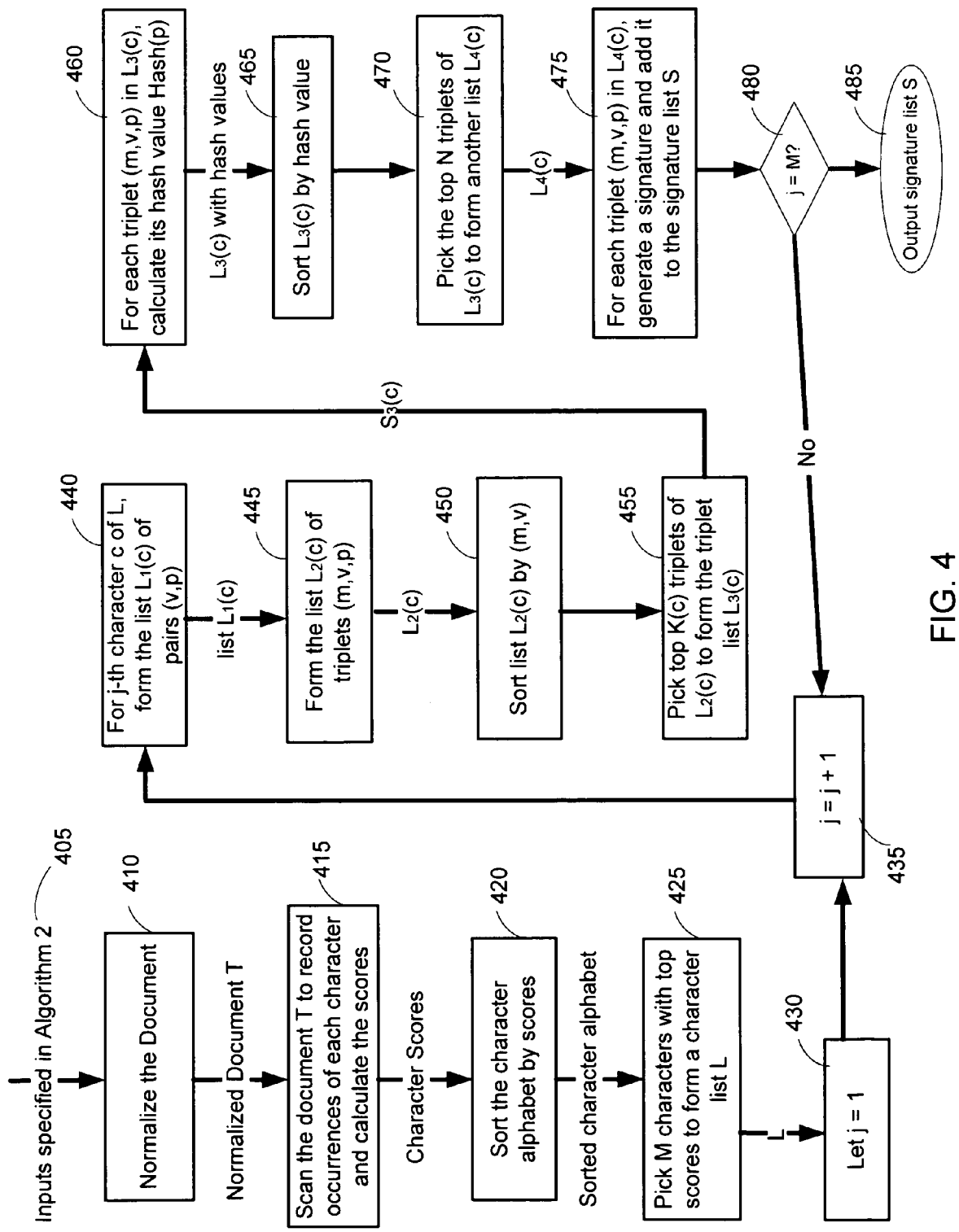
FIG. 4 illustrates a second embodiment of a signature generation process for use with universal transformation format encoded documents in accordance with the present invention.

FIG. 4 illustrates a second embodiment of a signature generation process in accordance with the present invention. The second embodiment includes a process that inputs 405, for example, a textual document of any language in plain UTF-8 format (universal transformation format) and a list of characters in UTF-8 alphabet that we consider as being informative. In addition, other inputs may include some number M, which corresponds to a number of characters with top ranking scores, and some number N, which corresponds to a maximum signature number for each character. Other optional inputs may include a constant integer CHAR_NEIGHBOR, which can have a predefined value, for example, 30. This constant integer defines a size of a character's neighbor in a text string, which will be used to generate signatures. Another input is a selection rate R. It has a range predefined range between 0 and 1, for example, 0.20. The selection rate is a number for use of selecting a subset out of a set. Yet another input may be an empty signature list S.

The process normalizes 410 the document by scanning the document to remove the characters that are not informative. A non-informative character is a UTF-8 character that does not contribute to the text context. They may provide other purposes such as formatting. For example, if a string has n consecutive spaces, then n−1 spaces are considered non-informative. Other examples of non-informative characters include control (CTRL) characters and returns.

The process then scans 415 the normalized document to record the occurrences of each character, c, in the UTF-8 alphabet. The position of the occurrences is denoted as P(1,c), P(2,c), . . . , P(n,c). The process calculates (or generates) the ranking score for the character c using:

$$\text{Score}(c) = \text{Sqrt}(n) * [P(n,c) - P(1,c)] / \text{Sqrt}(D)$$

where $D = [(P(2,c)-P(1,c))]^2 + [(P(3,c)-P(2,c))]^2 + \ldots + [(P(n,c)-P(n-1,c))]^2$. The score function measures an importance of a character in the text by its frequency. The score function also ensures that the characters that are evenly distributed over the document get better scores. A calculation for achieving this includes:

$$[P(n,c) - P(1,c)] / \text{Sqrt}(D).$$

The process continues with sorting 420 the character alphabet by score and then selects (or picks) 425 the M characters with top scores. This generated list may be denoted as character list L. It is noted that M can be any integer and may be predefined within the system or may be selected as an input into the system as previously described.

For each character c in the character list L, at each occurrence p of character c, the process calculates its neighbor. In particular, the process values by taking its left and right character and concatenating all the encoding bytes together to form an integer v. This neighbor-value v and the occurrence p make a pair (v, p). Next, the process assigns 430 a value of 1 to a variable j. Variable j is an enumeration of the list L. By using j, members of L may be processed one by one. In the illustrated process, this structure is used to realize a concept of "each" and is incrementally increased 435. In turn, this forms 440 a list $L_1(c)$ of pairs for each character c in the character list L. The size of the list $L_1(c)$ may be denoted as N(c). For each list $L_1(c)$, the process counts the repeats m of each neighbor-value v in the list to form 445 a second list $L_2(c)$ with triplets (m, v, p). The size of the second list $L_2(c)$ also may be denoted as N(c). Each list $L_2(c)$ is sorted 450 by (m, v), where m is the first comparison parameter and v is the second comparison parameter.

The process selects (or picks) 455 the top K(c) triplets from the second sorted list $L_2(c)$, where $K(c) \leq R*N(c)$. This forms a third list $L_3(c)$. For each triplet (m, v, p) of the third list $L_3(c)$, the process calculates 460 its hash value by a hash function, hash(p), which generates hash value with the neighboring characters surrounding the occurrence position p. An example of an applicable hash function may be the conventional Karp-Rabin hash function. The number of neighboring characters is determined by CHAR_NEIGHBOR. The process sorts 465 the third list $L_3(c)$ by hash value and selects (picks) 470 up to N triplets from the top of sorted list $L_3(c)$ to form a fourth list $L_4(c)$. It is noted that N can be any integer and may be predefined within the system or may be selected as an input into the system as previously noted. For each triplet (m, v, p) in $L_4(c)$, the process generates 475 a signature using the characters surrounding the occurrence position p and add it into signature list S. It is noted that process described is iterative, and therefore, is iterated for all characters c in list L. In other words, the variable j (indicating the j-th character c of L) is incremented 435 until j=M 480, where M is the number of characters with top scores. At the end of the process, a signature list S is output 485.

The signature generator is a unique configuration that beneficially replaces the roles of keywords when composing queries. The signature generator is efficient because it reduces the size of hits. This increases the performance of the matching engine. Moreover, the signature generator improves the search precision rate of the matching engine. Further the signature generator can be structured to be language-independent, thus expanding the scope of documents available for search.

Overall, signatures play a particular role in a search engine in a manner that may be more useful than conventional keywords. Signatures are abstracted from documents in a manner as described herein to characterize/represent documents better than keywords. Hence, they are more relevant to the documents than keywords. Note that signatures may be different than keywords in that a signature is strongly relevant to a document while a keyword is not necessarily so, two irrelevant documents do not share any signature while they could own the same single keyword, and signatures achieve better search precision rates than keywords.

A system in accordance with the present invention also may include opportunities for relevance detection. With respect to relevance detection, each document can be considered as a string of characters (ASCII, Unicode, etc.) of an alphabet. Thus, the relevance of two documents is strongly related to the similarity of two strings. There are conventional approaches to define the similarity of two strings. One approach is to get the largest common subsequence of two strings. A second approach is to extract the largest common substring of two strings. However, both of these approaches do have limitations that often make their use inadequate. The largest common string approach does not include other smaller common substrings, and therefore, is not accurate. The largest common subsequence approach cannot deal with content swapping, and therefore, is also inaccurate.

A third approach, in accordance with the present invention, starts with string similarity. For example, consider two strings str1 and str2, and a list S of substrings of the $2^{nd}$ string str2. This list satisfies conditions that all members in S do not overlap, the length of each member in S should be greater than a minimum value M, and each member of S is also a substring of str1. It is noted that M can be any integer and may be predefined within the system or may be selected as an input into the system.

For all sets of substrings satisfying the noted three conditions, S gets maximal sum of all substring lengths. A function SIM is applied to measure the similarity of str2 to str1. The function may be defined by:

SIM(str2,str1)=(sum of lengths of all substrings in S)/(length of str2)*100%

It is advised that the function SIM is not symmetric, i.e., SIM(str1,str2)≠SIM(str2,str1). For example, consider str1="AAAAACCCCCCCCBBBBBBDDDDDDAAAA AALLLLLLL" and str2="CCCCCCCCCZZZZZAAAAAAABBBBTTTTLLL". The required minimum of substring length may be set, for example, as M=4. Then S={"AAAAAA", "CCCCCCCC", "BBBB"} the substrings of str2 is what is needed to calculate a similarity:

SIM(str2,str1)=18/27=67%.

The example above illustrates one embodiment of similarity of two strings that is actually defined by substring copies from str1 to str2 with a minimum size requirement of each copy. In text documents, there are many characters that are not necessarily contributing to the document context. For example, extra space and invisible characters are not informative at all. Hence, these useless characters are first removed from the documents before applying the function SIM. This process may be referenced as string normalization. For example, the string "There are some useless characters in this sentence!" can be normalized as "There are some useless characters in this sentence!". In this example, there are unneeded (or useless) spaces between words in the original sentence and only one space between words after normalization.

In addition to the above, consider the following example given two text documents doc1 and doc2 in plain ASCII or UTF-8 format. Initially, documents doc1 is normalized to become string str1 and document doc2 is normalized to become string str2. The relevance of doc2 to doc1 is defined by SIM (str2, str1), which can be denoted as RLVN(doc2, doc1). The function RLVN is not symmetric in this example.

Next, string suffixes are considered. Given a string $X=x_0 x_1 \ldots x_n$ of n+1 characters, where the first n characters comprise the actual string and $x_n=\$$ is a unique sentinel character not defined in the ASCII or UTF-8 table, a suffix of X starting in the position i where i=0, 1, . . . , n, is denoted as S(X,i). In this example, S(X,0)=X and S(X,n)=$ and the string X has n+1 suffixes (or suffix strings). In addition, the suffix strings are sorted. String X has n+1 suffix strings. These can be sorted lexicographically by any means. Suffix sorting is a conventional algorithm problem known to those skilled in the art.

Relevance Detection Processes

Figure 5:
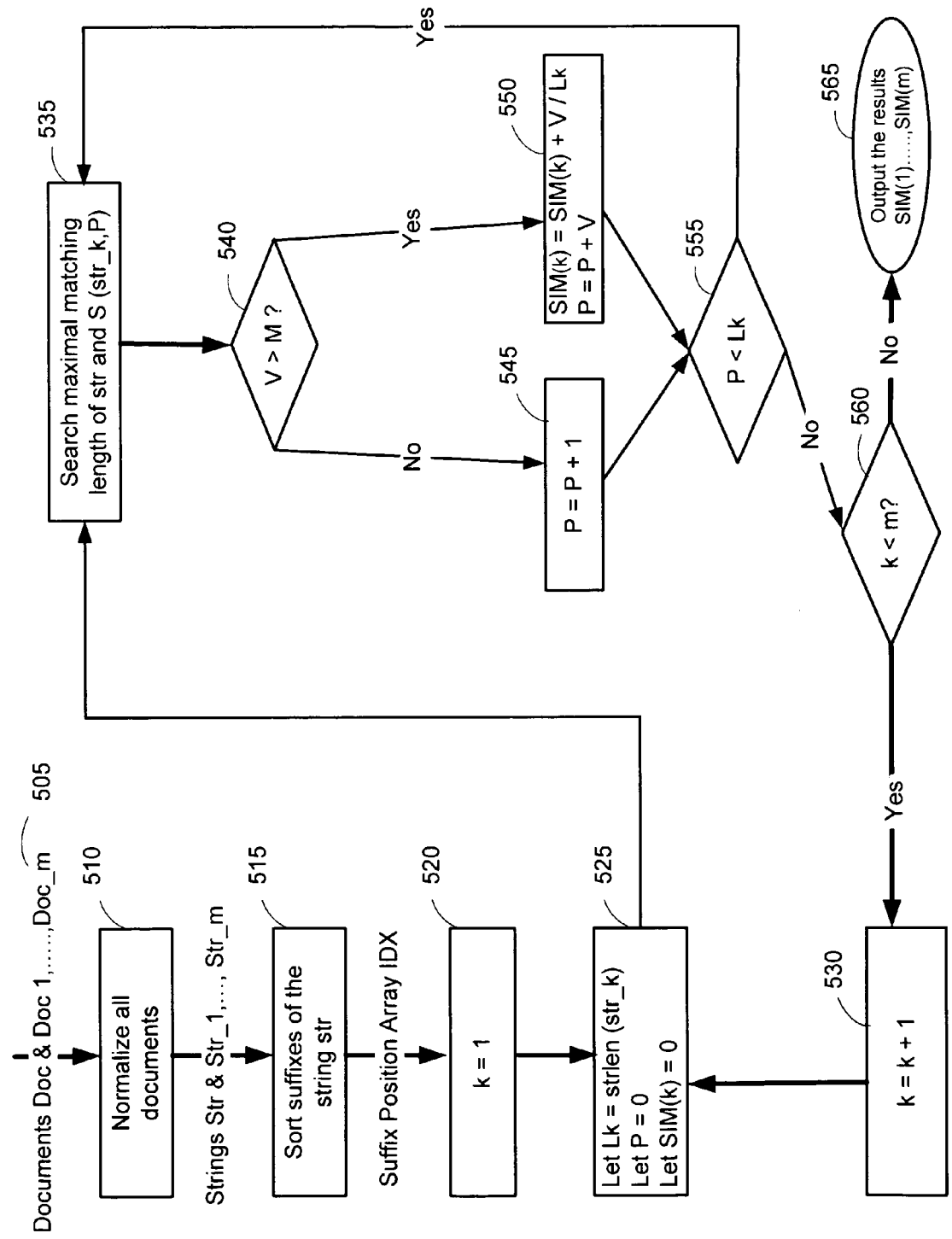
FIG. 5 illustrates a first embodiment of a relevance detection process in accordance with the present invention.

With the above overview in mind, reference is now made to FIG. 5. FIG. 5 illustrates a first embodiment of a relevance detection process in accordance with the present invention. The process starts with input 505 of an initial document (e.g., referenced as doc) plus one or more additional documents, plus an integer M. By way of example, there the list of additional documents may be a list of text documents to be matched. The additional documents may be referenced as $doc_1$ (or doc_1) through $doc_m$. (or doc_m), where m is the number of additional documents and M is an integer corresponding to a minimum substring match length. It is noted that M can be any integer and may be predefined within the system or may be selected as an input into the system as previously described.

The process normalizes 510 all the documents, initial doc plus additional $doc_1$, through dock, to get strings str, $str_1$ (or str_1) through $str_m$ (or str_m). Through use of a conventional suffix sorting algorithm, the process sorts 515 the suffixes of str with an array IDX to record the suffix string positions. It is noted that array IDX is known in conventional suffix sorting algorithms. The process then assigns (or lets) 520 a variable, k, to be assigned a value, for example, assigning k=1. It also assigns (lets) 525 variable L be a length of string str, variable $L_k$ be the length of $str_k$, variable P=0, and $SIM_k=0$.

The process next searches 535 a maximum matching length of string str and S($str_k$, P). In particular, the process assigns (lets) variable V=searchMaxMatchLen (IDX, 0, L, str, L, S($str_k$,P), $L_k$–P), where searchMaxMatchLen ( ) is a recursive function to calculate the maximal matching length of string str and S($str_k$, P) as defined further:

```
int searchMaxMatchLen (int IDX, int start, int end, char *str, int len,
char *str2, int len2) {
int i, j;
if(end–start < 2) {
i = getMaxMatchSize(str+IDX[start], len –IDX[start], str2, len2);
j = getMaxMatchSize(str+IDX[end], len –IDX[end], str2, len2);
if(i > j)
   return i;
else
   return j; }
i = start+(end–start)/2;
if(strncmp(str+IDX[i], str2, minimum(len–IDX[i], len2)) < 0)
   return searchMaxMatchLen (IDX, i, end, str, len, str2, len2);
else
return searchMaxMatchLen (IDX, i, start, str, len, str2, len2); }
int getMaxMatchSize(char *str, int len, char *str2, int len2) {
int i;
for(i = 0; (i < len) && (i < len2); i++)
if(str[i] != str2[i]) break;
return i; }
```

The above illustrates an example of a function searchMax-MartchLen to search the suffix string (of string str) which shares the longest common prefix substring with another string str2. This function is implemented by a binary search. The function getMaxMatchSize is to get the longest common prefix among two strings. Next, the process determines 540 V>=M, then it assigns 550 $SIM_k=SIM_k+V/L_k$, P=P+V. Otherwise, if the process determines 540 that condition V>=M is not met, the process increments 545 variable P so that P=P+1. If the process then determines 555 that P<$L_k$, the process goes back to searching 535 a maximum matching length of string str and S($str_k$, P).

If the process determines 555 that the condition P<$L_k$ is not met, the process then determines 560 if k<m. If k<m, the process increments 530 k by k=k+1 and process goes back to assign 525 variable L be a length of string str, variable $L_k$ be the length of $str_k$, variable P=0, and $SIM_k$=0. If the process determines 560 that condition k<m is not met, the process outputs 565 the results of $SIM_1, \ldots, SIM_m$.

The output advantageously presents a similarity in percentages between an input document and a list of additional documents. For example, as illustrated above there is given a threshold percentage x % and an input document to find the documents in the stored index document database. The process beneficially generates the signatures of the input document by signature generator. The searcher searches the index database using the signatures and returns a list of documents (hits), each of which shares at least one common signature with the input documents. The relevance detection process calculates the similarity between the input document and each document in the list. These are output as $SIM_1, \ldots, SIM_m$. The process can now select documents that satisfy $SIM_k$>=x %. This logic also is implied through the matching engine architecture.

Figure 6:
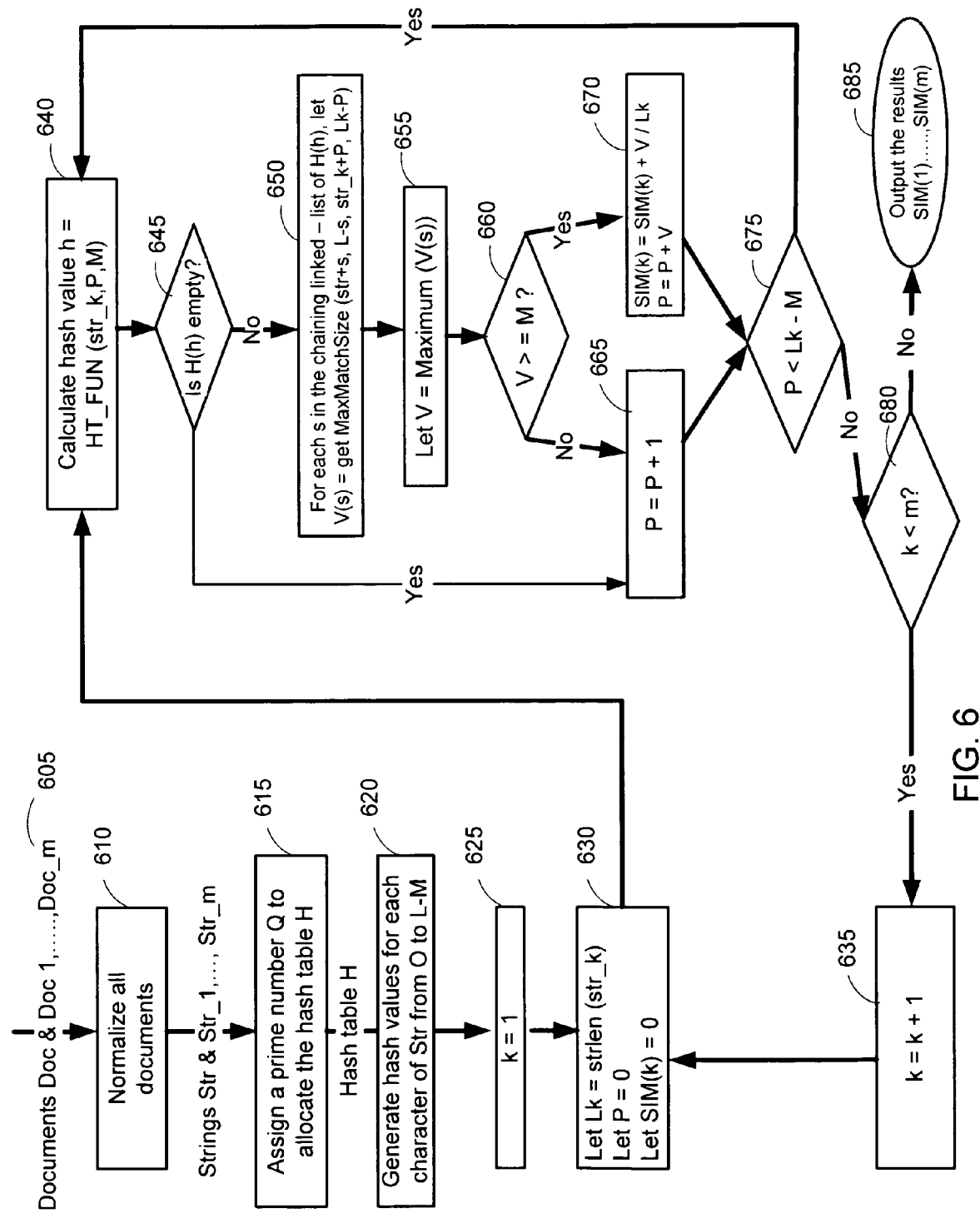
FIG. 6 illustrates a second embodiment of a relevance detection process in accordance with the present invention.

Referring now to FIG. 6, it illustrates a second embodiment of a relevance detection process in accordance with the present invention. The process begins with an input 605 of an initial text document, referenced as doc, and a list of text documents to be matched to the doc, plus an integer M. The list of text documents is referenced as $doc_1, \ldots, doc_m$, where m is the number of text documents and M is a minimum substring match length. It is noted that M can be any integer and may be predefined within the system or may be selected as an input into the system as previously described.

The process normalizes 610 doc, $doc_1, \ldots, doc_m$ to generate (or produce) strings str, $str_1, \ldots, str_m$. Next, the process assigns 615 a prime number, Q, which is larger than the size of string str and is referenced as L. By way of example, assume for purposes of describing this embodiment that Q=3*L/2. The process allocates an array H with size Q for a hash table with chaining capability to resolve collisions of hash values. For a given variable, j=0 to L-M, the process generates 620 a hash value, h=HT_FUN(str, j, M), and stores the string position, j, in H[h]. Alternatively, it may store it in collision chaining linked-list. The hash function HT_FUN is to calculate a hash value of a substring of the string str, which starts at position j and with a length M. In one example embodiment, a conventional Karp-Rabin hash function may be applied.

Next, a variable k is assigned 625 a value, for example, k=1. Further, values also are assigned 630 for $L_k$ to be the length of string $str_k$, P=0, and $SIM_k$=0. The process calculates 640 a hash value so that h=HT_FUN($str_k$, P, M). The process looks up a hash table entry H[h] and determines 645 if H[h] is empty. If H[h] is not empty, then for each string position s of the chaining linked-list at H[h], the process assigns 650 a variable V(s)=getMaxMatchSize(str+s,L−s, $str_k$+P, $L_k$−P) to get the maximal matching length of two sub-strings. The process then assigns 655 V=maximum(V(s)). Variable V represents the length of the largest prefix string of S($str_k$,P) and this prefix is also a substring of string str.

If the process determines 660 that V>=M, it assigns 670 $SIM_k=SIM_k+V/L_k$, and P=P+V. If it determines 660 that V<M, it assigns 665 P=P+1. Likewise, if the process had determined that H[h] is empty, it would assign 665 P=P+1. In either of these latter aspects of the process, the next step is to determine 675 if P<$L_k$−M. If P<$L_k$−M, the process goes back to calculating 640 a hash value so that h=HT_FUN($str_k$, P, M). However, if the process determines that P is not less than $L_k$−M, it then determines 680 whether k<m. If k<m, the process increments 635 k so that k=k+1 and assigns values 630 for $L_k$ to be the length of string $str_k$, P=0, and $SIM_k$=0. If k is not less than m, the process outputs 685 $SIM_1, \ldots, SIM_m$. As noted above, the output advantageously presents a similarity in percentages between an input document and a list of additional documents.

The relevance detection engine beneficially is configured to determine document relevance in percentage measurements. The configuration is structured so that irrelevant documents included in hits can be filtered out by a percentage threshold. This increases search engine utilization and provides results having a greater degree of acceptance.

In one embodiment, the relevance detection engine is beneficially structured to provide a document filter. It calculates a relevance (or similarity) between a given document and a list of other documents based on the definition of document relevance. The relevance is given in percentages. For a given threshold X %, the engine filters out the documents in the list that have relevance less than X %.

Overall, the disclosed matching engine with signature generation includes a number of unique features and advantages. Application of a signature generator and a relevance detection engine as described above each add unique aspects individually and within a system configuration.

Computer Apparatus

Figure 7:
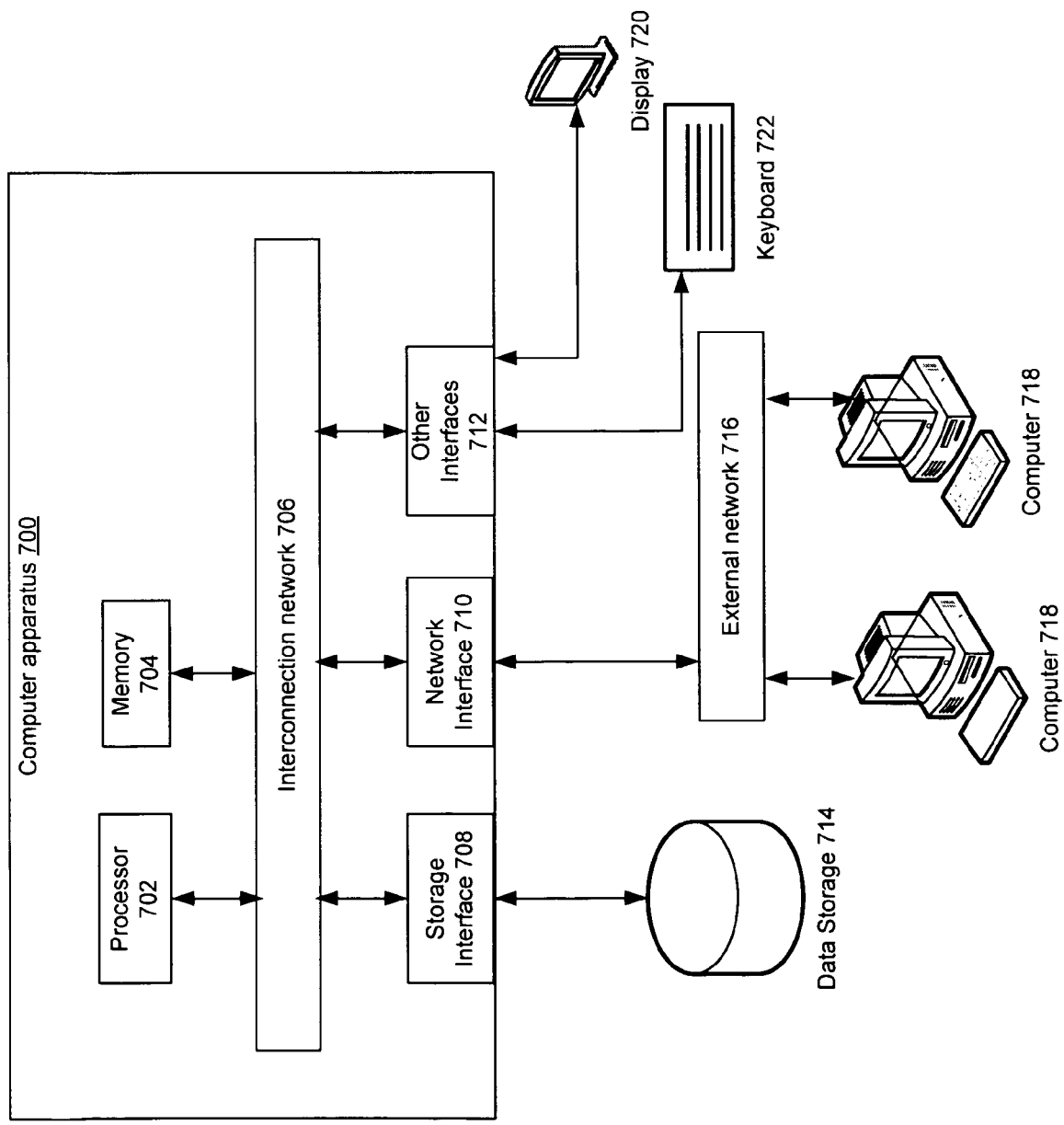
FIG. 7 is a schematic diagram depicting an example computer apparatus 700 which may be configured to perform various method steps in accordance with an embodiment of the invention.

FIG. 7 is a schematic diagram depicting an example computer apparatus 700 which may be configured to perform various method steps in accordance with an embodiment of the invention. Other designs for the computer apparatus may be used in alternate embodiments. As discussed above, embodiments of the present invention may be performed by multiple computer apparatus 700 communicatively interconnected by a network.

As shown in FIG. 7, the computer apparatus 700 comprises a processor 702, a computer-readable memory system 704, a storage interface 708, a network interface 710, and other interfaces 712. These system components are interconnected through the use of an interconnection network (such as a system bus or other interconnection system) 706. The memory 704 may be configured to include, in addition to other components and data, processor-executable instructions to perform various method steps disclosed herein.

The storage interface 708 may be used to connect storage devices 714 to the computer apparatus 700. The network interface 710 may be used to communicate with other computers 718 by way of an external network 716. The other interfaces may interface to various devices, for example, a display 720, a keyboard 722, and other devices.

Conclusion

The features and advantages described in the specification provide a beneficial use to those making use of a system and a method as described in embodiments herein. For example, an user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention.

This description should be read to include one or at least one and the singular also includes the plural unless it is obvious that it is meant otherwise.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An automated method of document matching using asymmetrical signature generation, the method comprising:
   receiving documents from a document repository;
   generating signatures for each of the documents using a first signature generator;
   providing the signatures and a document identifier for each of the documents to a signature database;
   receiving an input document;
   generating signatures for the input document using a second signature generator; and
   searching the signature database using the signatures generated for the input document,
   wherein the first and second signature generators are configured such that different numbers of signatures are generated for a same document, and
   wherein the first and second signature generators each:
     receive a document comprising a plurality of characters;
     normalize the document to remove non-informative characters from the plurality of characters;
     calculate a score for each informative character of the plurality of characters based on an occurrence frequency and distribution in the document;
     rank each informative character of the plurality of characters based on the calculated score;
     select, from the ranked informative characters, character occurrences; and
     generate a signature for each selected character occurrence.

2. The method of claim 1, wherein the first signature generator is configured to generate less signatures from the same document than the second signature generator.

3. The method of claim 2, wherein the first and second signature generators are both configured with a same tolerance level, and wherein the tolerance level relates to an expectation that the method is able to identify document variations.

4. The method of claim 3, wherein the first and second signature generators are both configured to generate an increasing number of signatures as a document text size increases.

5. The method of claim 2, wherein a plurality of the second signature generators are each located at a protection point of a network.

6. The method of claim 5, wherein protection points of the network include interne protocol routers.

7. The method of claim 5, wherein protection points of the network include wireless access points.

8. The method of claim 5, wherein protection points of the network include input/output interfaces of host computers.

9. The method of claim 5, wherein protection points of the network include input/output interfaces of mobile devices.

10. An automated method of matching an input document to a set of documents from a document repository, the method comprising:
    storing a signature database including a document identifier and signatures
      generated by a first signature generator for each of the set of documents;
    receiving an input document;
    generating signatures for the input document using a second signature generator; and
    searching the signature database using the signatures generated for the input document,
    wherein the first and second signature generators are configured such that different numbers of signatures are generated for a same document, and
    wherein the first and second signature generators each:
      receive a document comprising text;
      parse the document to generate a token set comprising a plurality of tokens, each token corresponding to the text in the document separated by a predefined character characteristic;
      calculate a score for each token in the token set based on a frequency and distribution of the text in the document;
      rank each token in the token set based on the calculated score;
      select, from the ranked tokens, a subset of ranked tokens; and
      generate a signature for each occurrence of the selected tokens.

11. The method of claim 10, wherein the first signature generator is configured to generate less signatures from the same document than the second signature generator.

12. The method of claim 11, wherein the first and second signature generators are both configured with a same tolerance level, and wherein the tolerance level relates to an expectation that the method is able to identify document variations.

13. The method of claim 12, wherein the first and second signature generators are both configured to generate an increasing number of signatures as a document text size increases.

14. The method of claim 11, wherein the second signature generator is located at a protection point of a network.

15. The method of claim 14, wherein protection points of the network include internet protocol routers.

16. The method of claim 14, wherein protection points of the network include wireless access points.

17. The method of claim 14, wherein protection points of the network include input/output interfaces of host computers.

18. The method of claim 14, wherein protection points of the network include input/output interfaces of mobile devices.

19. A computer readable storage medium structured to store instructions executable by a processor, the instructions when executed causing a processor to:
    store a signature database including a document identifier and signatures generated by a first signature generator for each of the set of documents;
    receive an input document;
    generate signatures for the input document using a second signature generator; and
    search the signature database using the signatures generated for the input document, wherein the first and second signature generators are configured such that different numbers of signatures are generated for a same document, and wherein the first and second signature generators are each configured to:
  receive a document comprising a plurality of characters;
  normalize the document to remove non-informative characters from the plurality of characters;
  calculate a score for each informative character of the plurality of characters based on an occurrence frequency and distribution in the document;
  rank each informative character of the plurality of characters based on the calculated score;
  select, from the ranked informative characters, character occurrences; and
  generate a signature for each selected character occurrence.

20. A computer apparatus comprising:
  a processor configured to execute computer-readable instructions;
  memory configured to store data, including said computer-readable instructions; and
  a communications system interconnecting said processor and memory,
  wherein said computer-readable instructions are configured to store a signature database including a document identifier and signatures generated by a first signature generator for each of the set of documents, receive an input document, generate signatures for the input document using a second signature generator, search the signature database using the signatures generated for the input document, and wherein the first and second signature generators are configured such that different numbers of signatures are generated for a same document, and wherein the first and second signature generators are each configured to:
  receive a document comprising text;
  parse the document to generate a token set comprising a plurality of tokens, each token corresponding to the text in the document separated by a predefined character characteristic;
  calculate a score for each token in the token set based on a frequency and distribution of the text in the document;
  rank each token in the token set based on the calculated score;
  select, from the ranked tokens, a subset of ranked tokens; and
  generate a signature for each occurrence of the selected tokens.

* * * * *